W. H. COLDWELL.
DRIVING MECHANISM FOR MOTOR VEHICLES.
APPLICATION FILED JUNE 18, 1914.
1,189,792. Patented July 4, 1916.
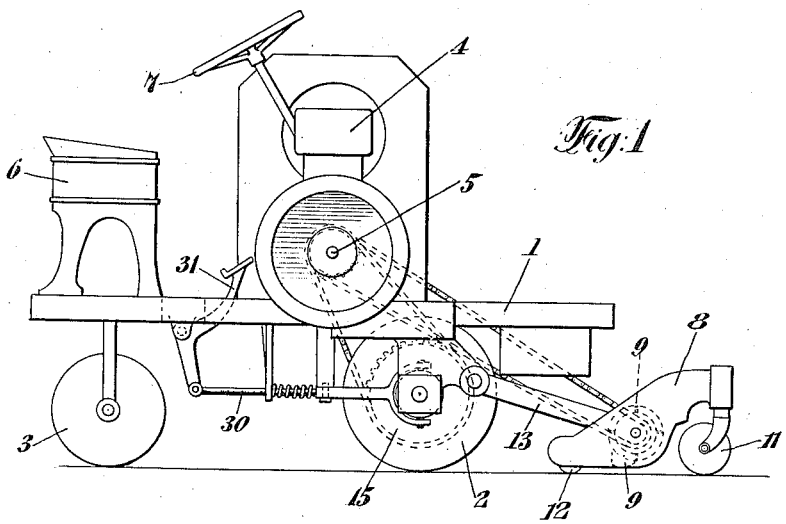
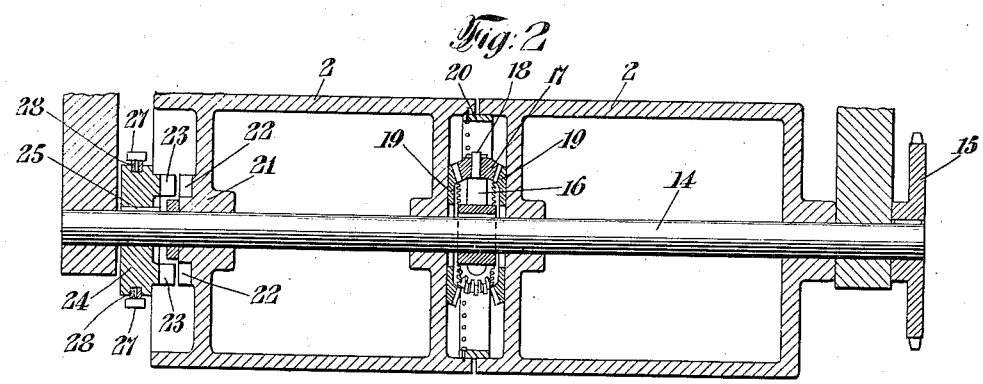
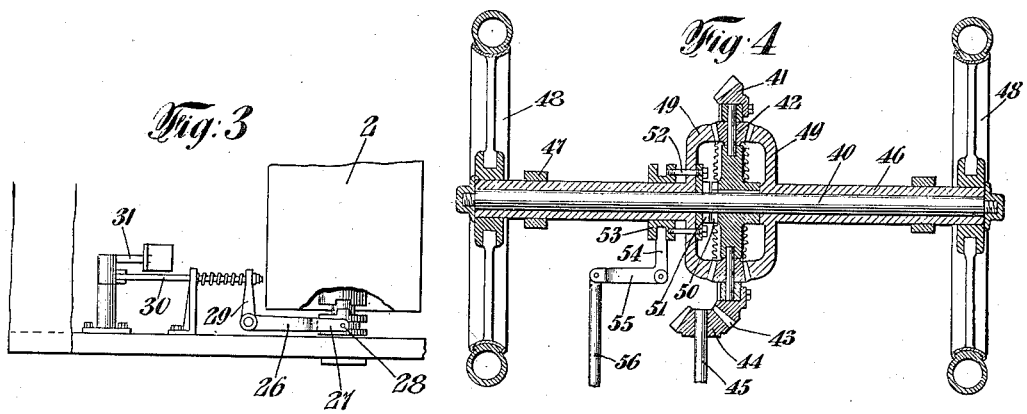
Witnesses:
John E. Prager
A. Worden Gibbs
William H. Coldwell Inventor
By his Attorneys
Whitaker & Prevost

UNITED STATES PATENT OFFICE.

WILLIAM H. COLDWELL, OF NEWBURGH, NEW YORK.

DRIVING MECHANISM FOR MOTOR-VEHICLES.

1,189,792.

Specification of Letters Patent. Patented July 4, 1916.

Application filed June 18, 1914. Serial No. 845,784.

*To all whom it may concern:*

Be it known that I, WILLIAM H. COLDWELL, a citizen of the United States, residing at Newburgh, in the county of Orange and State of New York, have invented certain new and useful Improvements in Driving Mechanism for Motor-Vehicles; and I do hereby declare the following to be a full, clear, and exact description of the invention, such as will enable others skilled in the art to which it appertains to make and use the same.

My invention consists in the novel features hereinafter described, reference being had to the accompanying drawings which illustrate two embodiments of my invention selected by me for purposes of illustration, and the said invention is fully disclosed in the following description and claims.

Referring to the said drawings, Figure 1 is a side elevation of a motor lawn mower embodying my invention. Fig. 2 is a transverse sectional view of the driving rollers showing my invention applied thereto. Fig. 3 is a partial top plan view of a portion of the motor lawn mower illustrating the form of clutch actuating mechanism shown in Fig. 1. Fig. 4 is a detail sectional view of a portion of an automobile structure showing my invention embodied therein.

In the construction of power operated vehicles such as motor lawn mowers, motor rollers, automobiles and the like, it is customary to apply the power to the rotary supporting and traction wheels or rollers through the instrumentality of a mechanism known in the art as "differential gearing." This differential gearing usually comprises the central rotary driving member generally termed the "spider" which carries a plurality of beveled pinions mounted therein on the radial axes and operatively connected with the source of power, and a pair of opposed beveled gear wheels located on opposite sides and in mesh with all of said pinions, each of said gear wheels being operatively connected with one of the traction rollers or wheels with the result that power from the driving means is applied to the spider and through the spider to the traction rollers or wheels substantially equally, while at the same time permitting one of the traction rollers or wheels to rotate more rapidly than the other, as in traversing a curve in turning. In the practical operation of driving mechanism of this character, it sometimes happens that one of the connected traction rollers or wheels will be in firm contact with the ground, while the other is raised slightly off of the ground or lies in or upon soft mud or other yielding surface which does not afford practically any traction and under such circumstances the wheel or roller which is in firm contact with the ground can remain stationary while all of the power is applied to the other wheel or roller which simply turns idly without advancing the vehicle. This condition frequently arises in the case of motor lawn mowers which have broad traction and lawn rolling rollers connected with the driving motor through the intervention of a differential gearing, and in which it frequently happens that the machine becomes so placed that one of the said rollers is in firm contact with the ground, while the other is partially or wholly supported above the ground. In the case of an automobile or other vehicle having widely separated traction wheels, this exact condition is less likely to occur but it frequently happens that one wheel rests on solid ground while the other wheel rests in a mud hole or in sand, so that it has no tractive power. In either case, and with either class of machine, it is difficult or impossible to move the machine and it frequently becomes necessary to place a board under the loose wheel or roller or to resort to some other means to make the traction of the two wheels more nearly equal before the machine can be moved.

The object of my present invention is to overcome this difficulty and to provide machines of this class with an emergency mechanism which can be brought into operation when required for the purpose of putting the differential gearing out of operative condition and directing the power of the prime motor, or other driving or propelling means directly to the wheel or roller which is in positive tractive relation with the ground so that under the circumstances previously described the vehicle may be readily caused to advance and may be quickly brought to a different portion of the roadway or ground where the traction of the wheels or rollers is more nearly equal.

In the case of automobiles, my invention produces an additional beneficial result, in that the operator can throw in the auxiliary mechanism before referred to and put the differential gearing out of operative condition when passing over wet or slippery surfaces where the vehicle is liable to skid, thus causing the power of the engine or motor to be applied directly to both wheels and preventing to a large extent, the skidding or sidewise movement of the vehicle, which in my opinion is due, to a considerable extent, at least, to the ability of the wheels to rotate independently as they may do where the differential gearing is in operative condition.

In Figs. 1, 2, and 3, I have shown my invention applied to a motor lawn mower of a well known type which, as shown in Fig. 1, comprises a main frame or chassis 1, supported upon a pair of traction and lawn rollers 2—2, and a steering roller or rollers 3, the said chassis carrying a prime motor such as a gasolene explosion engine 4 provided with a driving shaft 5. The said machine is also provided with a driver's seat 6, and the steering wheel 7 operatively connected in any usual manner with the steering roller or rollers 3. The machine is also provided with a cutter frame 8 provided with a rotary cutter 9, and stationary cutter 10, indicated in dotted lines, the said mower frame being supported by caster wheels 11 and the rear or ground roller 12, and operatively connected with the chassis 1 by links 13 so that the mower frame is pushed ahead of the chassis in a well known way. The driving shaft 5 of the motor is operatively connected with the traction rollers 2, as hereinafter described, by sprocket or other gearing, and the driving shaft is also operatively connected by sprocket chain or otherwise with the shaft of the rotary cutter 9. These parts of the machine are of well known structure and their specific details do not of themselves form a part of my present invention.

The traction and lawn rolling rollers 2—2 shown in Fig. 2 are ordinarily mounted loosely upon the driving shaft 14, which is provided with a driving wheel or sprocket 15, operatively connected with the engine shaft by a suitable chain. The shaft 14 has secured thereto adjacent to its center, a driving member or spider 16 which carries a plurality (usually 3 or 4) of beveled pinions 17, mounted upon radial studs or shafts 18 with which the spider is provided, and projecting on opposite sides of the spider. Each of the rollers 2 is provided at its inner end with a beveled gear wheel 19, which gear wheels are on opposite sides of and are in mesh with the pinions 17, in the usual manner. I prefer to provide one of the rollers 2 with a band or annular flange 20 which extends into the other roller to close the crevice between the two rollers and protect the differential gear from dirt and particles of grass, etc.

In the embodiment of my invention shown in Figs. 1, 2, and 3, I have shown one of the rollers 2, (the one at the left in Fig. 2) provided at its outer end with a clutch member 21, which may be formed integral with the roller or separate therefrom, and connected thereto, the same being of the well known type of dog clutch member, that is to say, having as herein shown, recesses 22 to engage the dogs or projections 23 on the other clutch member 24, which in this instance is mounted on the shaft 14 and connected thereto by a spline 25 so as to be movable longitudinally of the shaft into and out of engagement with the clutch member 21. The movable clutch member 24 may be thrown into and out of gear with the clutch member 21 in any desired manner. In this instance I have shown a bell crank 26 (see Fig. 3) provided at its outer end with a yoke 27 having projections 28 engaging an annular groove in the movable clutch member 24, said bell crank having an arm 29 connected by a link 30 with a foot lever 31 extending to within convenient reach of the operator so that the clutch member 24 may be thrown into operative position quickly and easily when desired. It will be seen that by throwing this emergency clutch 24—21 into engagement the adjacent roller 2 will be rigidly locked to the driving shaft 14 through the clutch, and being thus unable to turn with respect to the shaft, its beveled gear 19 will be unable to move with respect to the pinions 17, which will therefore of necessity lock the opposed beveled gear 19 and the other roller 2 in fixed relation with each other and with the shaft 14. In other words, the differential gearing is prevented from performing its usual function and simply acts in the same manner as if the pinions 17 were studs or pins rigidly connecting the rollers 2—2. Consequently the power applied to the driving shaft 14 will be positively applied to both rollers in such a manner that they must turn simultaneously in the same direction, and if only one of the rollers is in tractive engagement with the ground (and it matters not which one may be so positioned) all the power will be applied to that roller and the machine must positively be advanced. It will be understood that in the ordinary use of the machine the clutch member 24 will be out of operative engagement with the clutch member 22 and the machine will operate in the usual manner, but that whenever it becomes desirable for any reason to throw the differential gearing out of operation and positively drive both rollers or wheels together, the clutch may be thrown in to accomplish this result.

In Fig. 4 I have shown one arrangement for embodying my invention in an automobile structure, the said figure illustrating the rear driving axle of the automobile and the connected parts. In this figure, 40 represents the rear axle upon which is mounted the driving member or spider 41 carrying the beveled pinions 42, mounted on axes disposed radially with respect to the spider. The spider in this instance is provided peripherally with a beveled gear wheel 43 meshing with a driving pinion 44 on a longitudinally disposed shaft 45 which is connected at its forward end with the prime motor on the vehicle (not shown) in any desired manner. 46—47 represent a pair of sleeves journaled on the axle 40 at opposite sides of the spider, each sleeve carrying at its outer end a traction wheel 48 and at its inner end a beveled gear wheel 49, the said beveled gear wheel operatively engaging the pinions 42 of the spider. The spider is provided on one side with a clutch member 50 and a movable clutch member 51 is mounted loosely on the shaft in position to engage the clutch member 50 and is connected by rods 52 extending through guiding apertures in the adjacent gear wheel 49, with a sliding collar 53 loosely mounted on the sleeve 47 and provided with an annular groove engaged by a yoke 54 on one end of a bell crank lever 55, the other end being connected by a link 56 with a suitable operating lever within reach of the driver. By means of this link 56 and bell crank 55 the collar 53 may be moved longitudinally of the sleeve 47 so as to move the clutch member 51 into engagement with the clutch member 50 when desired, thus locking the connected wheel 48 rigidly to the spider 41 and preventing relative movement between the pinions 42 and the gears 49, thus putting out of operation the differential gearing and causing the power from the shaft 45 to be transmitted positively to both of the traction wheels 48, as will be readily seen. It will be obvious that the clutch member 51 can be operated as before described to throw out the differential gearing and lock the wheels to the driving mechanism whenever one wheel rests upon mud, sand, or other yielding ground, so that the full power of the motor will be transmitted to the wheel which is in tractive relation with the ground. The clutch may also be operated when passing over wet or slippery surfaces as before stated to throw out of operation the differential gearing and prevent the vehicle from skidding or slipping sidewise.

I do not desire to be limited to the exact details of construction herein shown and described, as variations may be made in the same to secure the desired results without departing from my invention, but I desire to claim broadly in combination with two wheels ordinarily deriving power through a differential gearing, mechanism for positively locking the wheels in fixed relation with the driving mechanism and throwing the differential gearing out of operation, and connections whereby these means may be instantly thrown into or out of action while the mechanism is in operation.

What I claim and desire to secure by Letters Patent is:—

1. In a motor vehicle, the combination with an integral driving shaft extending from one side of the vehicle to the other, of a pair of rotary traction devices each loosely mounted on said shaft, differential gearing comprising a driven gear member secured to each of said rotary traction devices, and a driving member secured to rotate with said shaft and provided with pinions mounted thereon and each engaging each of said driven gear members, and clutch mechanism for positively connecting one of said loosely mounted traction devices to the said shaft.

2. In a motor vehicle the combination with an integral driving shaft extending from one side of the vehicle to the other, of a pair of rotary traction devices each loosely mounted on said shaft, a driven gear member fixed to each of said rotary devices, a spider fixed to the driving shaft between said driven gear members and provided with pinions each of which engages both of said driven gear members, a clutch member secured to rotate with one of said rotary traction members, a movable clutch member secured to rotate with the shaft but movable longitudinally thereof, and means for throwing said movable clutch member into and out of engagement with the other clutch member.

In testimony whereof I affix my signature, in the presence of two witnesses.

WILLIAM H. COLDWELL.

Witnesses:
E. W. WYATT,
BERTHA B. APPEL.